US010070323B2

(12) United States Patent
Agrawal et al.

(10) Patent No.: US 10,070,323 B2
(45) Date of Patent: Sep. 4, 2018

(54) METHOD AND APPARATUS FOR MANAGING A NAP MODE ON AN ELECTRONIC DEVICE

(71) Applicant: MOTOROLA MOBILITY LLC, Chicago, IL (US)

(72) Inventors: Amit Kumar Agrawal, Bangalore (IN); Rachid M. Alameh, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 197 days.

(21) Appl. No.: 14/843,368

(22) Filed: Sep. 2, 2015

(65) Prior Publication Data
US 2017/0064060 A1   Mar. 2, 2017

(51) Int. Cl.
*H04W 24/02* (2009.01)
*H04M 1/725* (2006.01)
*H04M 1/72* (2006.01)

(52) U.S. Cl.
CPC ....... *H04W 24/02* (2013.01); *H04M 1/72566* (2013.01); *H04M 1/72569* (2013.01)

(58) Field of Classification Search
CPC .............................. H04M 1/247; H04W 24/02
See application file for complete search history.

(56) References Cited

U.S. PATENT DOCUMENTS

| 8,634,858 | B1* | 1/2014 | Jackson | H04W 4/023 455/41.2 |
| 2005/0084075 | A1* | 4/2005 | Kotzin | H04M 1/72569 379/38 |
| 2006/0135182 | A1* | 6/2006 | Unmehopa | H04L 67/24 455/456.6 |
| 2013/0018284 | A1* | 1/2013 | Kahn | G04G 13/026 600/595 |
| 2016/0022218 | A1* | 1/2016 | Hayes | A61G 7/005 600/301 |
| 2017/0064071 | A1* | 3/2017 | Won | H04M 1/7253 |

OTHER PUBLICATIONS

Min, Jun-Ki et al.: "Toss 'n' Turn: Smartphone as Sleep and Sleep Quality Detector", ACM Conference on Human Factors in Computing Systems(CHI), Apr. 2014, all pages.

(Continued)

*Primary Examiner* — Muthuswamy Manoharan
(74) *Attorney, Agent, or Firm* — Wolfe-SBMC

(57) ABSTRACT

A method and apparatus for managing a nap mode on an electronic device includes an electronic device configured to monitor sleeping for a user of the electronic device during a sleep-monitoring time interval and determine a sleep quality score for the user based on the monitoring. When the sleep quality score is less than a threshold sleep quality score, the electronic device is configured to monitor for the user to be napping during a nap-monitoring time interval that is non-concurrent with the sleep-monitoring time interval. The electronic device is further configured to detect during the nap-monitoring time interval that the user is napping and to initiate the nap mode on the electronic device in response to detecting the user is napping, wherein the nap mode includes disabling an audible alert on the electronic device.

20 Claims, 6 Drawing Sheets

(56) References Cited

OTHER PUBLICATIONS

Ondrej Krejcar, Jakub Jirka and Dalibor Janckulik, "Use of Mobile Phones as Intelligent Sensors for Sound Input Analysis and Sleep State Detection", Sensors 2011, in revised form: May 31, 2011 / Accepted: Jun. 1, 2011 / Published: Jun. 3, 2011, ISSN 1424-8220, all pages.

Rozenfeld, Monica: "Smartphone App Detects Sleep Apnea, Mobile technology could fill a gap in medical diagnosis", Smartphone App Detects Sleep Apnea—IEEE—The Institute, http://theinstitute.ieee.org/technologyfocus/technologytopic/smartphoneappdetectssleepapnea, Jan. 23, 2015, all pages.

\* cited by examiner

METHOD AND APPARATUS FOR MANAGING A NAP MODE ON AN ELECTRONIC DEVICE

FIELD OF THE DISCLOSURE

The present disclosure relates generally to managing a nap mode on an electronic device and more particularly to detecting napping during a time interval and responsively disabling and enabling functionality of the electronic device.

BACKGROUND

Well into the digital age, many users of electronic devices keep personal electronic devices on or about their person for most of the day. In some instances, users fall asleep during the day without having the opportunity or will to first silence audible alerts played by their personal electronic devices. These audible alerts have the potential to disturb the users while they are napping.

BRIEF DESCRIPTION OF THE FIGURES

The accompanying figures, where like reference numbers refer to identical or functionally similar elements throughout the separate views, form part of the specification and illustrate embodiments in accordance with the included claims.

Figure 1:
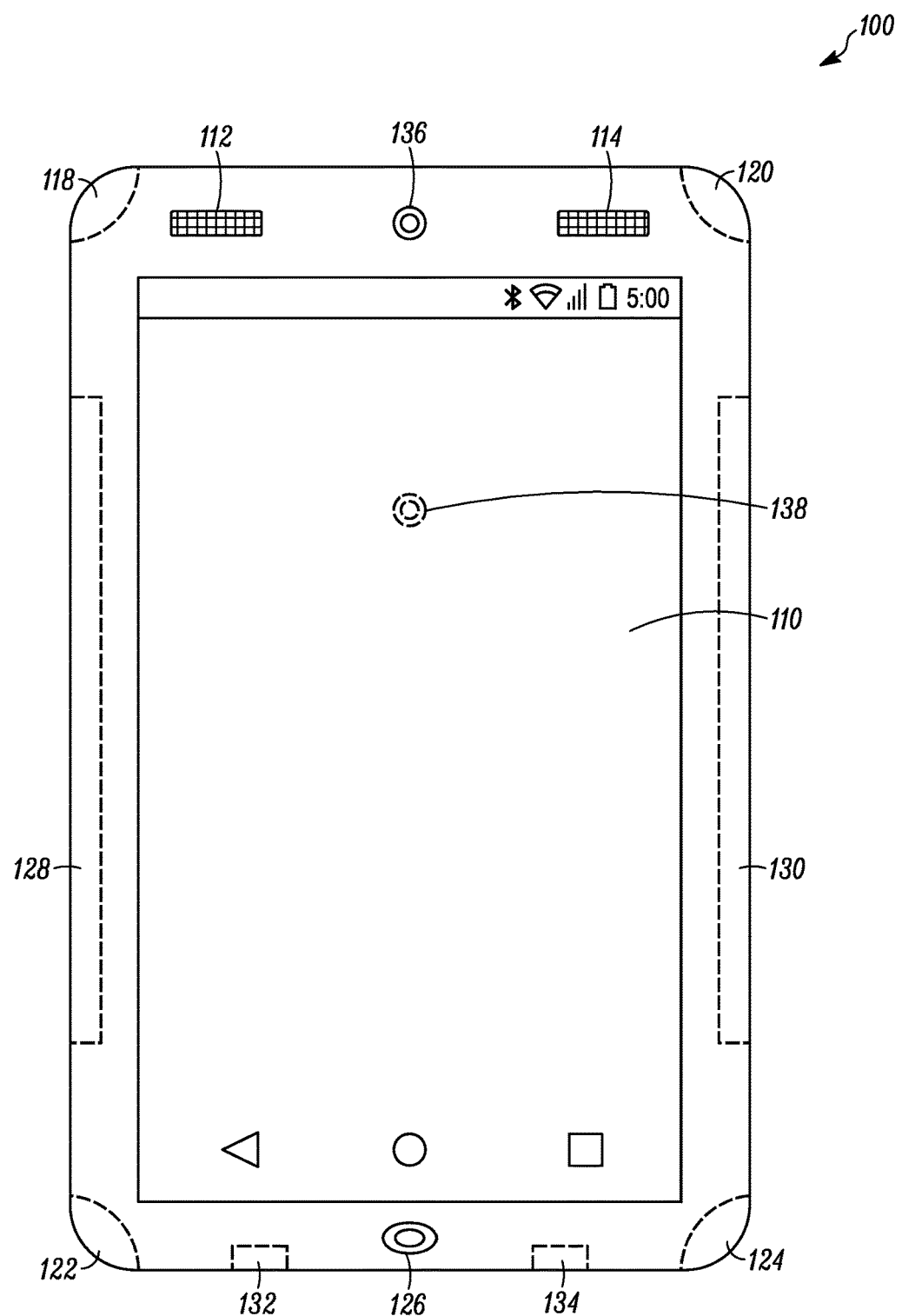
FIG. 1 shows an electronic device, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present teachings. In addition, the description and drawings do not necessarily require the order presented. It will be further appreciated that certain actions and/or steps may be described or depicted in a particular order of occurrence while those skilled in the art will understand that such specificity with respect to sequence is not actually required.

The apparatus and method components have been represented, where appropriate, by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

Generally speaking, pursuant to various embodiments described herein, the present disclosure provides a method and apparatus for managing a nap mode on an electronic device. More specifically, an electronic device monitors for a user to be napping during a particular time interval and initiates a nap mode when the user is detected napping. While in the nap mode, the electronic device performs operations and manages its functionality to facilitate not disturbing the user during napping.

In accordance with the teachings herein, a method performed by an electronic device for managing a nap mode includes monitoring sleeping for a user of the electronic device during a sleep-monitoring time interval and determining a sleep quality score for the user based on the monitoring. When the sleep quality score is less than a threshold sleep quality score, the method also includes monitoring for the user to be napping during a nap-monitoring time interval that is nonconcurrent with the sleep-monitoring time interval. The method further includes detecting during the nap-monitoring time interval that the user is napping and initiating the nap mode on the electronic device in response to detecting the user is napping, wherein the nap mode includes disabling an audible alert on the electronic device.

Further in accordance with the teachings herein, a method performed by an electronic device for managing a nap mode includes monitoring for a user of the electronic device to be napping, wherein the monitoring is limited to a nap-monitoring time interval occurring during daytime. The method further includes detecting, while monitoring, that the user is napping at a nap detection time and automatically adjusting at least one of a start time or an end time for the nap-monitoring time interval based on the nap detection time. The method additionally includes initiating the nap mode on the electronic device in response to detecting the user is napping, wherein the nap mode includes disabling an audible alert on the electronic device.

Also in accordance with the teachings herein is a first electronic device, configured to manage a nap mode. The first electronic device includes a clock configured to indicate time and a set of sensors configured to detect if a user of the first electronic device is napping. The first electronic device further includes a processing element operatively coupled to the clock and the set of sensors. The processing element is configured to monitor, using the set of sensors, sleeping of the user device during a sleep-monitoring time interval indicated by the clock and to determine a sleep quality score for the user based on the monitoring. When the sleep quality score is less than a threshold sleep quality score, the processing element is further configured to monitor for the user to be napping during a nap-monitoring time interval, indicated by the clock, which is nonconcurrent with the sleep-monitoring time interval and to detect during the nap-monitoring time interval, using the set of sensors, that the user is napping. The processing element is additionally configured to initiate the nap mode on the first electronic device in response to detecting the user is napping, wherein the nap mode includes disabling an audible alert on the first electronic device.

For a particular embodiment, the first electronic device additionally includes at least one communication interface configured to receive calls from and send indications to a second electronic device. The processing element is operatively coupled to the at least one communication interface. The processing element is further configured to automatically send a first indication to the second electronic device using the at least one communication interface while the first electronic device is in the nap mode. The first indication causes the second electronic device to present a second indication when a call is initiated from the second electronic device to the first electronic device or a third electronic device belonging to a contact stored on the second electronic device for the user of the first electronic device. The second indication is configured to provide a notification on the second electronic device indicating that the user of the first electronic device is unavailable.

An electronic device, also referred to simply as a device, is any device configured to detect if a user of the device is napping, and in response to detecting the user is napping, to initiate a nap mode on the device for which some functionality of the device is enabled and/or disabled. A non-exhaustive list of electronic devices consistent with described embodiments includes smartphones, smartwatches, phablets, tablets, laptops, personal media players, personal digital assistants, and enterprise digital assistants.

A user of an electronic device is a person who handles, programs, operates, or in any way makes use of the electronic device for its designed purpose. A user may or may not be an owner of an electronic device. For example, an electronic device is owned by a first person and also has an account set up for a second person. Both the first person and the second person are users of the electronic device. A third person who operates the electronic device but does not have an account on the device is also a user of the device.

Both napping and sleeping are a state of rest for the body and mind of a user during which time volition and consciousness are in partial or complete abeyance, and there is a diminished but readily reversible sensitivity and responsiveness to external stimuli. External stimuli can include noise, movement, or contact of sufficient strength to wake the user. Napping is distinguished from sleeping by the time at which it occurs. Sleeping is identified by a primary and periodic time period during which a user rests. Sleeping, for example, typically occurs each night for between five to ten hours. Some users, such as those working second or third shifts, might take their primary rest during the daytime. Napping is identified by a shorter period of rest, typically three hours or less, which may or may not be periodic. In a first example, a user who did not sleep well during the night takes a nap during the day. In a second example, a user who sleeps only five hours each night takes regular naps during the day.

FIG. 1 shows an electronic device, specifically a smartphone 100, which is referred to in describing included embodiments. The smartphone 100 is shown with a number of components, namely: a display 110; left 112 and right 114 stereo speakers; four thermal sensors 118, 120, 122, 124 located at corners of the smartphone 100; an infrared sensor 126; left 128 and right 130 tactile sensors located on sides of the smartphone 100; left 132 and right 134 stereo microphones; and front-facing 136 and rear-facing 138 cameras. These components 110, 112, 114, 118, 120, 122, 124, 126, 128, 130, 132, 134, 136, 138 enable the smartphone 100 to function in accordance with described embodiments. In other embodiments, different electronic devices having similar components are used to perform similar functionality described herein with respect to the smartphone 100. These electronic devices and their included components are represented by and described with reference to FIG. 2.

Figure 2:
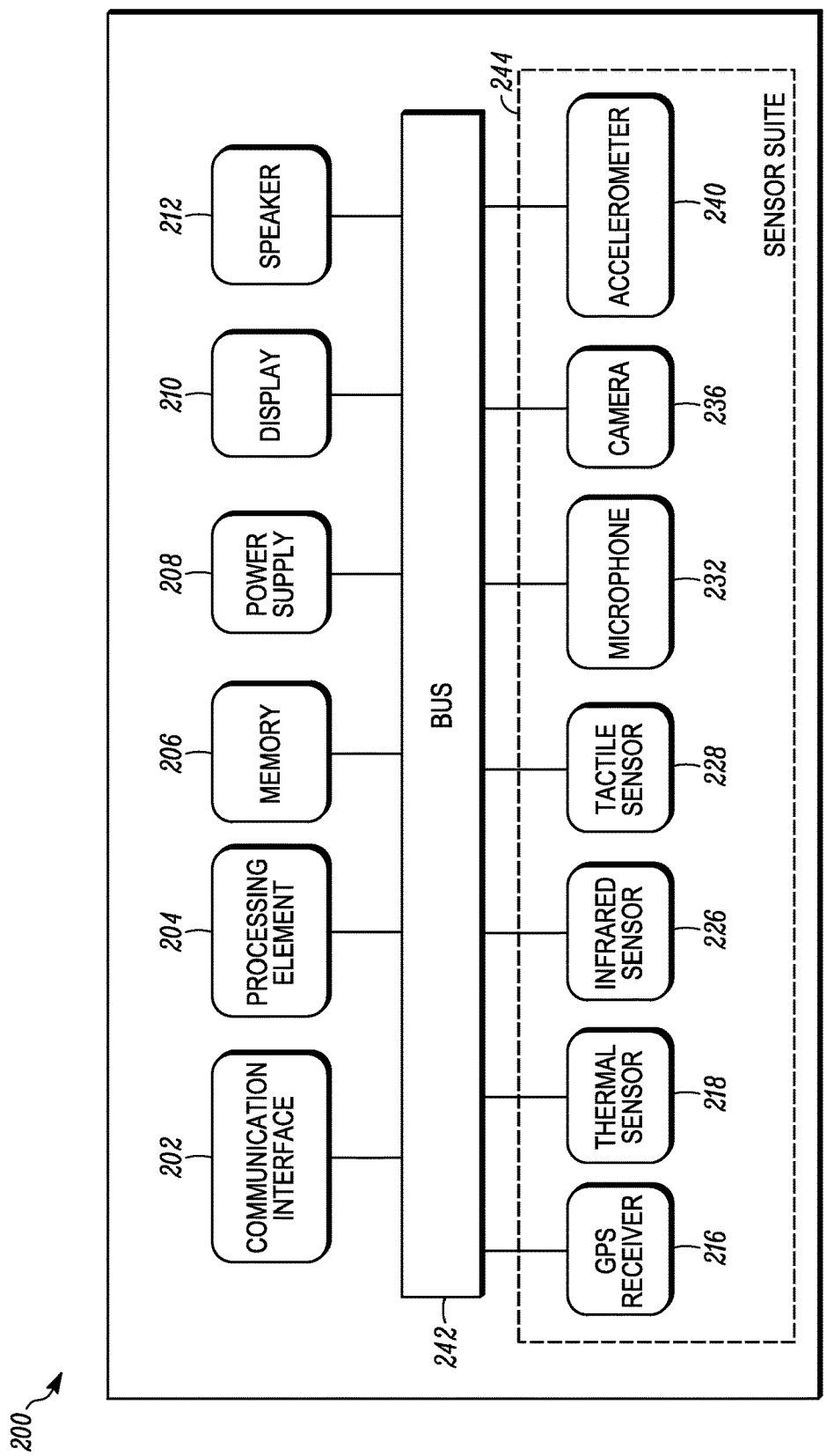
FIG. 2 shows a block diagram of an electronic device, in accordance with some embodiments.

FIG. 2 shows a block diagram of a nonspecific electronic device 200 in accordance with embodiments of the present teachings. For a particular embodiment, the electronic device 200 represents the smartphone 100. Included within the electronic device 200 are a communication interface 202, a processing element 204, memory 206, a power supply 208, a display 210, and a speaker 212, which are all operationally interconnected by a bus 242. The electronic device 200 also has a suite of sensors 244 which includes a global positioning system (GPS) receiver 216, a thermal sensor 218, an infrared sensor 226, a tactile sensor 228, a microphone 232, a camera 236, and an accelerometer 240. As shown, the suite of sensors 244 is coupled to the processing element 204 though the bus 242. In other embodiments, some or all of the sensors 216, 218, 226, 228, 232, 236, 240 in the sensor suite 244 can be coupled to the processing element 204 though a sensor hub.

A limited number of device components 202, 204, 206, 208, 210, 212, 216, 218, 226, 228, 232, 236, 240, 242 are shown within the electronic device 200 for ease of illustration. Other embodiments may include a lesser or greater number of components in an electronic device. Moreover, other components needed for a commercial embodiment of an electronic device that incorporates the components 202, 204, 206, 208, 210, 212, 216, 218, 226, 228, 232, 236, 240, 242 shown for the electronic device 200 are omitted from FIG. 2 for clarity in describing the enclosed embodiments.

The processing element 204, for instance, includes arithmetic logic and control circuitry necessary to perform the digital processing, in whole or in part, for the electronic device 200 to initiate a nap mode in response to detecting that a user is napping and to perform functionality in accordance with described embodiments for the present teachings. For one embodiment, the processing element 204 represents a primary microprocessor, also referred to as a central processing unit (CPU), of the electronic device 200. For example, the processing element 204 can represent an application processor of a tablet. In another embodiment, the processing element 204 is an ancillary processor, separate from the CPU, wherein the ancillary processor is dedicated to providing the processing capability, in whole or in part, needed for the components 202, 206, 208, 210, 212, 216, 218, 226, 228, 232, 236, 240, 242 of the electronic device 200 to perform at least some of their intended functionality.

The memory 206 provides storage of electronic data used by the processing element 204 in performing its functionality. For example, the processing element 204 can use the memory 206 to load programs and/or store files associated with detecting napping and initiating a nap mode. In one embodiment, the memory 206 represents random access memory (RAM). In other embodiments, the memory 206 represents volatile or non-volatile memory. For a particular embodiment, a portion of the memory 206 is removable. For example, the processing element 204 can use RAM to cache data while it uses a micro secure digital (microSD) card to store files associated with functionality performed in conjunction with a nap mode.

One or more communication interfaces 202 allow for communication between the electronic device 200 and other electronic devices, such as smartphones or laptops, configured to interact with the electronic device 200 as part of the electronic device 200 performing its described functionality. These other devices, for example, can initiate a phone-to-phone, a computer-to-phone, a phone-to-computer, or a computer-to-computer call to the electronic device 200. The electronic device 200 can also send one or more indications to other electronic devices to initiate functionality performed on those devices.

For one embodiment, the communication interface 202 includes a cellular transceiver to enable the electronic device 200 to receive calls and/or messages from and to send indications to other electronic devices using one or more cellular networks. Cellular networks can use any wireless technology that, for example, enables broadband and Internet Protocol (IP) communications including, but not limited to: 3$^{rd}$ Generation (3G) wireless technologies such as CDMA2000 and Universal Mobile Telecommunications System (UMTS) networks; 4$^{th}$ Generation (4G) technologies such as LTE and WiMAX; or 5$^{th}$ Generation (5G) technologies.

In another embodiment, the communication interface 202 includes a wireless local area network (WLAN) transceiver that allows the electronic device 200 to access the Internet using standards such as Wi-Fi. The WLAN transceiver allows the electronic device 200 to send and receive radio signals to and from similarly equipped electronic devices using a wireless distribution method, such as a spread-spectrum or orthogonal frequency-division multiplexing (OFDM) method. For some embodiments, the WLAN transceiver uses an IEEE 802.11 standard to communicate with other electronic devices in the 2.4, 3.6, 5, and 60 GHz frequency bands. In a particular embodiment, the WLAN transceiver uses Wi-Fi interoperability standards as specified by the Wi-Fi Alliance to communicate with other Wi-Fi certified devices.

For additional embodiments, the communication interface 202 includes hard-wired connections to a network infrastructure that allows the electronic device 200 to communicate electronically with other devices. For example, the communication interface 202 includes a socket that accepts an RJ45 modular connector which allows the electronic device 200 to be connected directly to a network router by category-5 or category-6 Ethernet patch cable. The communication interface 202 can also use a cable modem or a digital subscriber line (DSL) to connect to the Internet, and thereby to other electronic devices, via an Internet service provider (ISP).

The display 210 and the speaker 212 are output components of the electronic device 200 that allow the device 200 to interface with a user. In particular, the display 210 and the speaker 212 generate alerts designed to notify the user of incoming calls, messages, or a current status of the device 200. The speaker, for example, generates an audible alert in the form of a ring tone to notify the user of an incoming call. The display generates a visual alert in the form of a pop-up message window to notify the user of an incoming text message.

The sensors 216, 218, 226, 228, 232, 236, 240 of the electronic device 200 are configured to detect if a user of the device 200 is napping. Some or all of the sensors can work independently or in combination with one another to provide data to the processing element 204 to make a napping determination. The camera 236, for example, can detect that the user's eyes are shut while the microphone 232 detects that the user is snoring. Upon receiving the combined data from the camera 236 and the microphone 232, the processing element determines the user is napping.

For several embodiments, some or all of sensors 216, 218, 226, 228, 232, 236, 240 are also configured to detect when the user is in proximity to the device 200. The user is in proximity to the device 200 when the user is near enough to the device 200 to hear an audible alert generated by the device 200. The microphone 232, for example, detects the user's voice when the user is in proximity to the device 200. The sound pressure level of the voice at the microphone provides data on the user's distance from the device 200. The camera 236 detecting an image of the user indicates the user is in proximity to the device 200. The size of the user in the image at a given zoom setting also provides data on the user's distance from the device 200.

The GPS receiver 216 is configured to detect where the device 200 is located. Some locations can support a determination that the user is napping. The device 200 being located in the user's residence and the user being in proximity to the device 200, for example, are consistent with a determination of napping. Narrowing the location to a short distance of a sofa within the user's residence provides stronger support for a napping determination. Alternately, the device 200 being located within a bathroom of the user's residence would support a determination that the user is not napping, provided the user is in proximity to the device 200. Determining the device 200 is located on a freeway also supports a determination that the user is not napping. An exception might be if the camera 236 detects the user is a passenger rather than an operator of a motor vehicle traveling on the freeway.

The infrared sensor 226 detects presence, and in some instances also motion, for the user in proximity to the electronic device 200 using infrared radiation. In different embodiments, the infrared sensor 226 can be passive or active. For embodiments in which multiple infrared sensors 226 are used, the multiple sensors 226 can be all passive, all active, or include a combination of passive and active sensors.

In a particular embodiment, the infrared sensor 226 is an active sensor that represents the sensor 126 of the smartphone 100. The sensor 126 emits near-infrared radiation of a relatively short wavelength of approximately 850 nanometers near the visible spectrum. In the presence of the user, the emitted radiation is reflected by the user and detected by the sensor 126. The strength of the detected radiation provides an indication of a distance between the user and the sensor 126.

The thermal sensor 218 detects the presence, and in some instances also the body position, of the user in proximity to the electronic device 200 using heat. The user is a source of heat, so the presence of the user near the thermal sensor 218 increases an ambient temperature at the thermal sensor 218, which the thermal sensor 218 detects. The thermal sensor 218 detecting that the user is standing, for example, supports a determination that the user is not napping. The thermal sensor 218 detecting that the user is seated or lying down might support a determination that the user is napping, depending upon data collected by other sensors.

In a particular embodiment, the thermal sensor 218 represents the thermal sensors 118, 120, 122, and 124 located at the corners of the smartphone 100. Each thermal sensor has a plurality of thermocouples between dissimilar metals wired in series so their voltages add. To omit negative voltage contributions from the sum, every other thermocouple is covered in a thermally opaque material. The remaining thermocouples are not so covered and generate only positive voltage contributions when subjected to heat.

By using thermal gratings at the corners of the smartphone 100, the smartphone 100 can also detect motion. Within the housing of the smartphone 100, above the thermal sensors 118, 120, 122, 124, alternating strips of thermally opaque and thermally transparent materials are used to create the thermal gratings. As a heat source moves relative to a thermal grating, an angle of incidence for the heat source at the thermal grating changes. As the angle of incidence changes, heat from the heat source is alternatingly screened and passed by the thermal grating, resulting in voltage fluctuations from the thermal sensor underneath that are interpreted as movement. Frequent or large detected movements made by the user support a determination that the user is not napping. The user moving very little or not at all over a period of several minutes or longer, together with data from other sensors, can support a determination that the user is napping.

The tactile sensor 228 detects if the device 200 is being held by the user. Specifically, the tactile sensor is configured to detect if one or both of the user's hands are in contact with the device 200. In a particular embodiment, the tactile sensor 228 represents the tactile sensors 128 and 130 located along the sides of the smartphone 100. When the user cradles the smartphone 100 in his left hand, for example, the user's left palm contacts the tactile sensor 128 while the user's fingers contact the tactile sensor 130. When the user holds the smartphone 100 with both hands, as is often done with texting, the user's left index finger contacts the left tactile sensor 128 while the user's right index finger contacts the right tactile sensor 130.

For a specific embodiment, the tactile sensor 228 is a capacitive sensor placed on or within a display, housing, or shell of the device 200. For embodiments in which multiple tactile sensors 228 are used, the tactile sensors are placed in different locations where the user is likely to hold the device 200. The tactile sensors 228 detect changes in capacitance as the user, or more specifically the user's hand, comes in contact with the device 200. In another embodiment, the device 200 uses pressure sensors as the tactile sensors 228. For example, the device 200 uses sensors that include a piezoelectric material that generates a detectable voltage when pressure from the user's grip is applied to the sensors 228. Tactile sensors 228 used by the device 200 can also include, but are not limited to, piezoresistive and electroresistive sensors. Further, in an additional embodiment, the device 200 uses a combination of different sensors of varying type to detect tactile contact with the device 200.

A tactile sensor of a specific type might be well suited for a particular location on a particular device based on a type of contact that is expected at that location on the device. For example, the backside of the smartphone 100 is cradled in the palm of the user's hand as he views the display 110 on the front of the smartphone 100. Where the user's hand is cupped, the smartphone 100 does not usually detect direct contact on its rear surface. By placing a photosensor on the back of the smartphone 100, the cupped hand might be inferred from a decrease in light reaching the photosensor. In one embodiment, an additional photosensor is placed on the front of the smartphone 100. By comparing the intensity of light reaching each photosensor, the smartphone 100 distinguishes a cradling palm-grip, where only the back photosensor detects diminished light, from a dark environment, where both photosensors detect diminished light.

The microphone 232 is configured to detect sounds, which in some instances support a determination that the user is or is not sleeping. Sounds received into the microphone 232 can be analyzed both contextually and in terms of a sound pressure level by sound processing hardware (not shown) and/or software included in the device 200. Detecting that the user is snoring, for example, provides contextual support for a determination that the user is napping. Even without a contextual relationship with napping, loud sounds can support a determination that the user is not napping. Detecting loud, continuous noise of approximately 95 decibels (db), such as construction noise, for instance, supports a determination that the user is not napping.

The camera 236 is configured to capture visual data, which is processed and analyzed to support a determination that the user is or is not napping. In one embodiment, the electronic device 200 is programmed for facial recognition. Upon detecting and identifying the user's face, the camera 236 captures image data that includes the user's eyes. The image data is then analyzed to determine if the user's eyes are open or shut. Open eyes support a determination that the user is not sleeping. When the eyes are detected to be shut, the device 200 captures and analyzes additional image data of the user's eyes. By analyzing multiple frames captured at different times, the device 200 can distinguish between the user blinking and the user having his eyes shut for a longer period of time. Detecting that the user's eyes are shut for a longer period of time than the period of time normally associated with blinking supports a determination that the user is napping.

For an embodiment, the thermal 218 and/or infrared 226 sensors detect that the user is in a seated position and has been relatively motionless for over 10 minutes. In a first case, the camera 236 captures image data which is analyzed by the device 200 to determine that the user is seated in the driver's seat of a motor vehicle. This supports a determination that the user is not napping. In a second case, the camera 236 captures image data which is analyzed by the device 200 to determine that the user is seated in an upholstered chair. This supports a determination that the user is napping.

The accelerometer 240 is configured to measure changes in acceleration for the device 200 in one or more directions. In different embodiments, the accelerometer 240 represents a single-axis accelerometer, a multiple-axis accelerometer, multiple single-axis accelerometers, or a combination of accelerometers of varying types. For some embodiments, the accelerometer 240 detects vibrations and/or shocks, such as when the device 200 is being driven over uneven or damaged pavement. The user traveling under such circumstances makes it less likely that the user is napping as compared to when motion-related impulses are not experienced by the user.

In a particular embodiment, the device 200 determines the user is walking or jogging from regular and periodic decelerations detected by the accelerometer 240 in the downward direction. In this case, the decelerations coincide with the user's footfalls. In another embodiment, the accelerometer 240 detects irregular and non-periodic downward decelerations. The accelerometer 240 might also detect intermittent lateral accelerations and decelerations. In this second case, the device 200 determines that the user is participating in a sporting activity, such as tennis or racquetball. The accelerometer 240 detecting that the user is exercising or experiencing rough travel provides an indication to the device 200 that the user is not napping.

As a further example of the device 200 using some of the sensors 216, 218, 226, 228, 232, 236, 240 in conjunction with one another, the tactile sensor 228 detects that the user is holding the device 200, the accelerometer 240 detects that the device 200 is not experiencing any accelerations or declarations, the camera 236 detects that the user's eyes are shut, the GPS receiver 216 detects that the device 200 is located in a living room of the user's residence, and the thermal sensor 218 detects that the user is lying down. In processing this detection data in accordance with a programmed algorithm, the device 200 determines that the user is napping.

The power supply 208 represents a power source that supplies electric power to the device components 202, 204, 206, 210, 212, 216, 218, 226, 228, 232, 236, 240, 242, as needed, during the course of their normal operation. The power is supplied to meet the individual voltage and load requirements of the device components 202, 204, 206, 210, 212, 216, 218, 226, 228, 232, 236, 240, 242 that draw electric current. For some embodiments, the power supply 208 is a wired power supply that provides direct current from alternating current using a full- or half-wave rectifier. For other embodiments, the power supply 208 is a battery that powers up and runs a portable electronic device. For a particular embodiment, the battery 208 is a rechargeable power source. A rechargeable power source for an electronic device is configured to be temporarily connected to another power source external to the electronic device to restore a charge of the rechargeable power source when it is depleted or less than fully charged. In another embodiment, the battery is simply replaced when it no longer holds sufficient charge.

Figure 3:
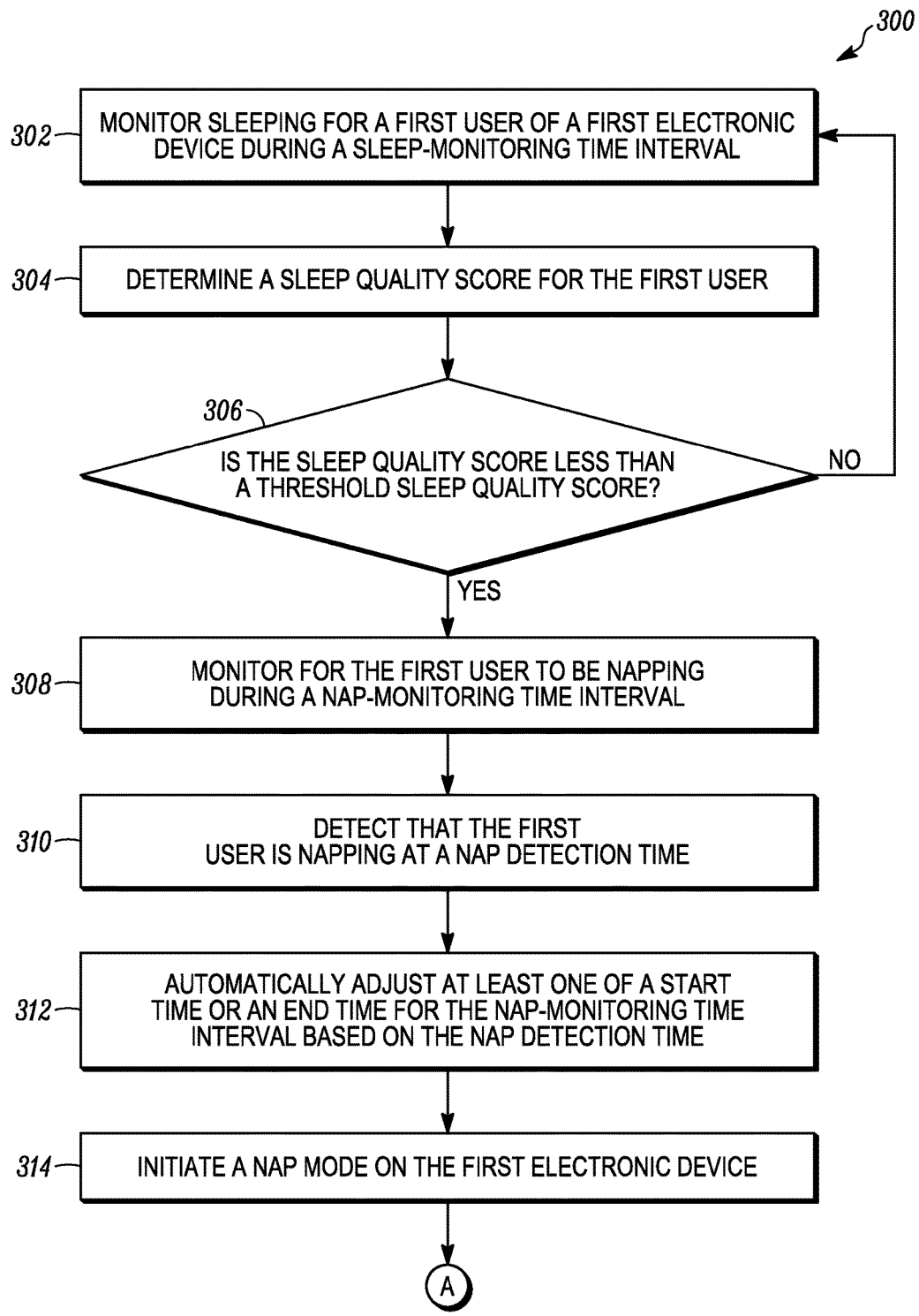
FIG. 3 shows a logical flow diagram illustrating a method for managing a nap mode, in accordance with some embodiments.
Figure 4:
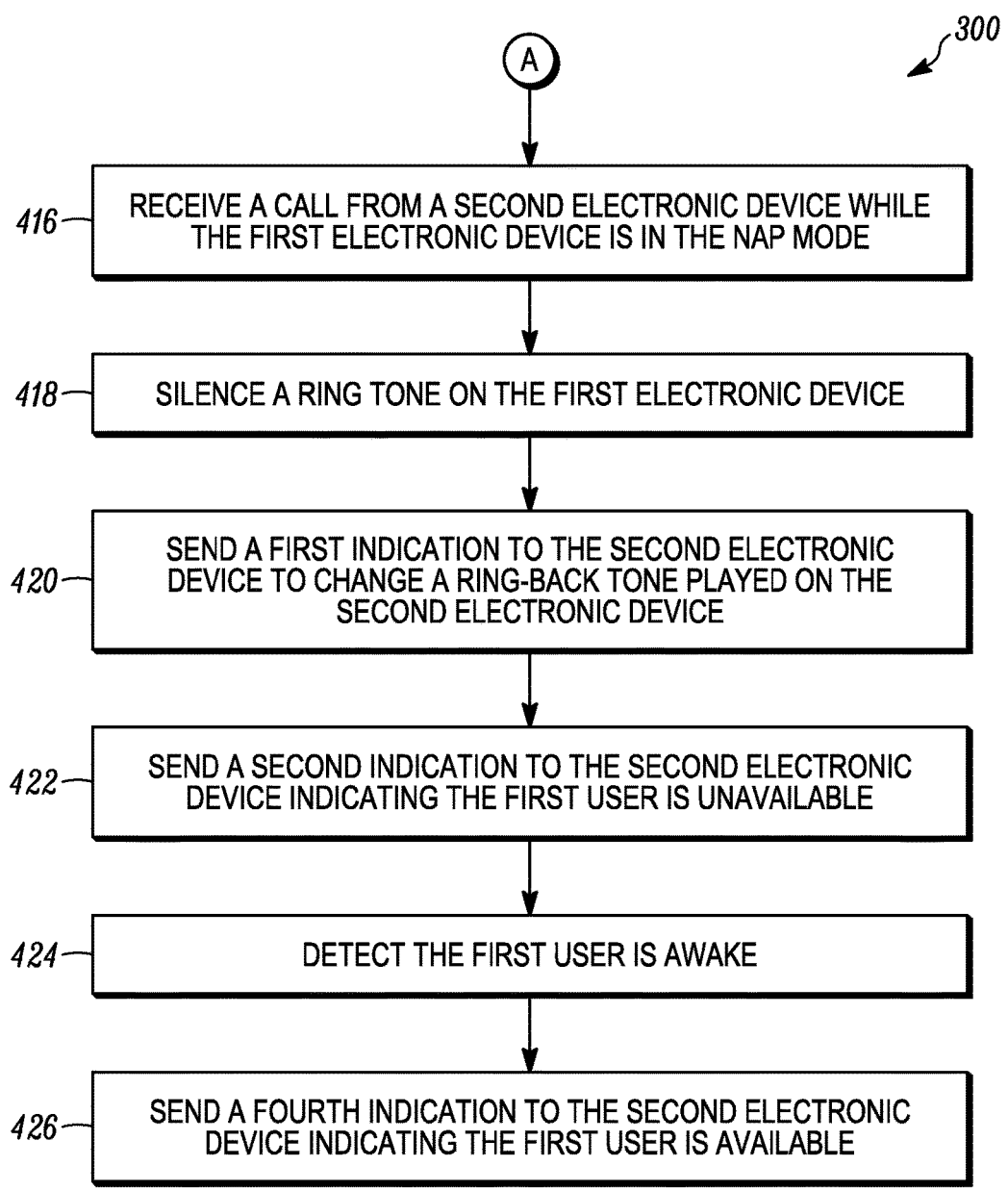
FIG. 4 shows a logical flow diagram illustrating a method for managing a nap mode, in accordance with some embodiments.

With reference to the remaining figures, a detailed description of the functionality of the components shown in FIGS. 1 and 2 is given. FIGS. 3 and 4 show a logical flow diagram illustrating a method 300 performed by an electronic device, taken to be the smartphone 100, to manage a nap mode on the electronic device. For the remainder of the detailed description, the smartphone 100 and the user of the smartphone 100 are referred to as the first device 100 and the first user, respectively. For some embodiments, the first device 100 interacts with a second device having a second user, who is different from the first user.

The method 300 begins with the first device 100 monitoring 302 the first user sleeping during a sleep-monitoring time interval. The sleep-monitoring time interval is an interval of time set on the first device 100 that provides the first device 100 with an indication of when to monitor the first user sleeping. For example, the sleep-monitoring time interval is set for an interval of time during which the first user regularly sleeps. For an embodiment, the first device 100 conserves computational resources and battery life by not monitoring sleeping at times not included in the sleep-monitoring time interval, when the first user is not likely to be sleeping. In another embodiment, a default sleep-monitoring time interval is set on the first device 100, for example, during nighttime and into early morning from 11 PM to 6 AM, when most people sleep. The default sleep-monitoring time interval can be programmed into the first device 100 prior to a time of sale and remains the sleep-monitoring time interval until reset or adjusted by the first user, or when the first user executes a factory reset on the first device 100.

For various embodiments, the first device 100 monitors sleeping using some or all of the sensors used by the first device 100 in detecting napping. For some embodiments, the first device 100 also uses one or more additional sensors configured to monitor sleeping. During or after monitoring 302 sleeping, the first device 100 determines 304 a sleep quality score for the first user. The sleep quality score is a quantitative assessment of how the first user slept during the sleep-monitoring time interval. Given a range of sleep quality scores from zero to ten, for instance, the first device 100 determines a score of zero when the first user does not sleep at all and determines a score of ten when the first user sleeps soundly during the entire sleep-monitoring time interval. If the first user wakes for a period of time during the sleep-monitoring time interval and/or tosses and turns, the first device 100 determines a sleep quality score for the first user of between zero and ten, depending on how long the first user was awake and/or how much he tossed and turned. In general, the first user receives a lower sleep quality score as he wakes more frequently or for longer periods of time.

After determining a sleep quality score for the first user, the first device 100 compares 306 the sleep quality score to a threshold sleep quality score. The threshold sleep quality score operates as a bound or limit in determining if the first device 100 will be monitoring for the first user to be napping. When the first user sleeps poorly, he is more likely to nap later in the day. When he sleeps well, he is less likely to nap later in the day. In determining whether or not to monitor for the first user to be napping, the first device 100 is effectively weighing the importance of detecting and allowing the first user to nap against the computational and energy cost of nap monitoring. The balance point is the threshold sleep quality score, which for an embodiment, is set or adjusted by the first user.

When the first device 100 determines 306 the sleep quality score for the first user is greater than or equal to the threshold sleep quality score, the first device 100 does not monitor for napping. The method 300 returns to block 302 where the first device 100 monitors sleeping for the first user during the next occurrence of the sleep monitoring time interval. When the first device 100 determines 306 that the sleep quality score for the first user is less than the threshold sleep quality score, the first device 100 monitors 308 for the first user to be napping during a nap-monitoring time interval that is nonconcurrent with the sleep-monitoring time interval.

The nap-monitoring time interval is an interval of time set on the first device 100 that provides the first device 100 with an indication of when to monitor for the first user to be napping. For example, the nap-monitoring time interval is set for an interval of time during which the first user typically naps. As with the sleep-monitoring time interval, the first device 100 conserves computational resources and battery life by not monitoring for napping at times not included in the nap-monitoring time interval, when the first user is not likely to be napping.

For a particular embodiment, the first device 100 receives as input a start time and an end time for the nap-monitoring time interval. The first user, for example, knowing that he rarely naps before lunch or after dinner, sets a start time of 12:30 PM and an end time of 5:00 PM for the nap-monitoring time interval. The first device 100 responsively sets a daily time period of between 12:30 PM and 5:00 PM as the nap-monitoring time interval. In a further embodiment, the first user also inputs into the first device 100 specific days that should be included or excluded from nap monitoring. The first user's employment responsibilities, for instance, prevent him from napping on Tuesdays and Thursdays. The first user indicates this information to the first device 100 so that the first device 100 excludes Tuesdays and Thursdays from nap monitoring.

Assuming the first user naps during the nap-monitoring time interval, the first device 100 uses some or all of its sensors to detect 310 the first user napping at a nap detection time. The nap detection time is the time at which the first device 100 first detects the first user is napping. In response to detecting the first user is napping, the first device 100 initiates 314 a nap mode. The nap mode is a state or condition of the first device 100 in which the first device 100 operates in a manner that is different or distinguishable from the manner in which the first device 100 operates when it is not in the nap mode. For an embodiment, the different manner in which the first device 100 operates while in the nap mode relates either directly or indirectly to the first user napping. In the nap mode, for example, the first device 100 temporarily enables and/or disables functionally so the first user can continue napping undisturbed. In some embodiments, temporarily disabling functionally that is not needed while the first user is napping conserves battery life.

In a first instance, the first device 100 silences an audible alert for new e-mails while in the nap mode to allow the first user to continue napping. In a second instance, the first device 100 stops synchronizing e-mail data with an e-mail server while in the nap mode to conserve battery life and to allow the first user to continue napping. In a third instance, the first device 100 silences multiple audible alerts and stops pinging other electronic devices for updates while in the nap mode.

The nap mode can be enabled on the first device 100 independently from or in connection with other modes or applications executing on the device 100. When the nap mode is active in a first case, functionality associated with the nap mode can execute at any time while the first device 100 is powered on. When the nap mode is active in a second case, functionality associated with the nap mode only operates while one or more applications are executing on the first device 100. For instance, the nap mode operates as a feature of an application while the application is executing. When the nap mode is active in a third case, the nap modes operates as a sub-mode of another mode, wherein the first device 100 can enable or disable the nap mode while the other mode is operating or continues to operate.

For a number of embodiments, the first device 100 automatically adjusts 312 at least one of the start time or the end time for the nap-monitoring time interval based on the nap detection time. The first device 100 adjusts a time interval automatically when the first device 100 adjusts the time interval without the first user interacting with the first device 100. The first device 100 operates proactively to adjust the time interval rather than reactively in response to manual input received from the first user.

In a particular embodiment, the first device 100 records multiple nap detection times for the first user as the first device 100 repeatedly performs the method 300 over a period of days, weeks, months, or years. The resulting set of nap detection times provides a statistically viable sample that the first device 100 analyzes to predict when the first user is most likely to be napping in the future. Based on the statistical analysis, the first device 100 adjusts the nap-monitoring time interval. In a further embodiment, the first device 100 readjusts the nap-monitoring time interval after recording and combining for analysis one or more new nap detection times with the previously recorded set of nap detection times. A more detailed description of the first device 100 automatically adjusting the nap-monitoring time interval is provided with reference to FIG. 5.

Figure 5:
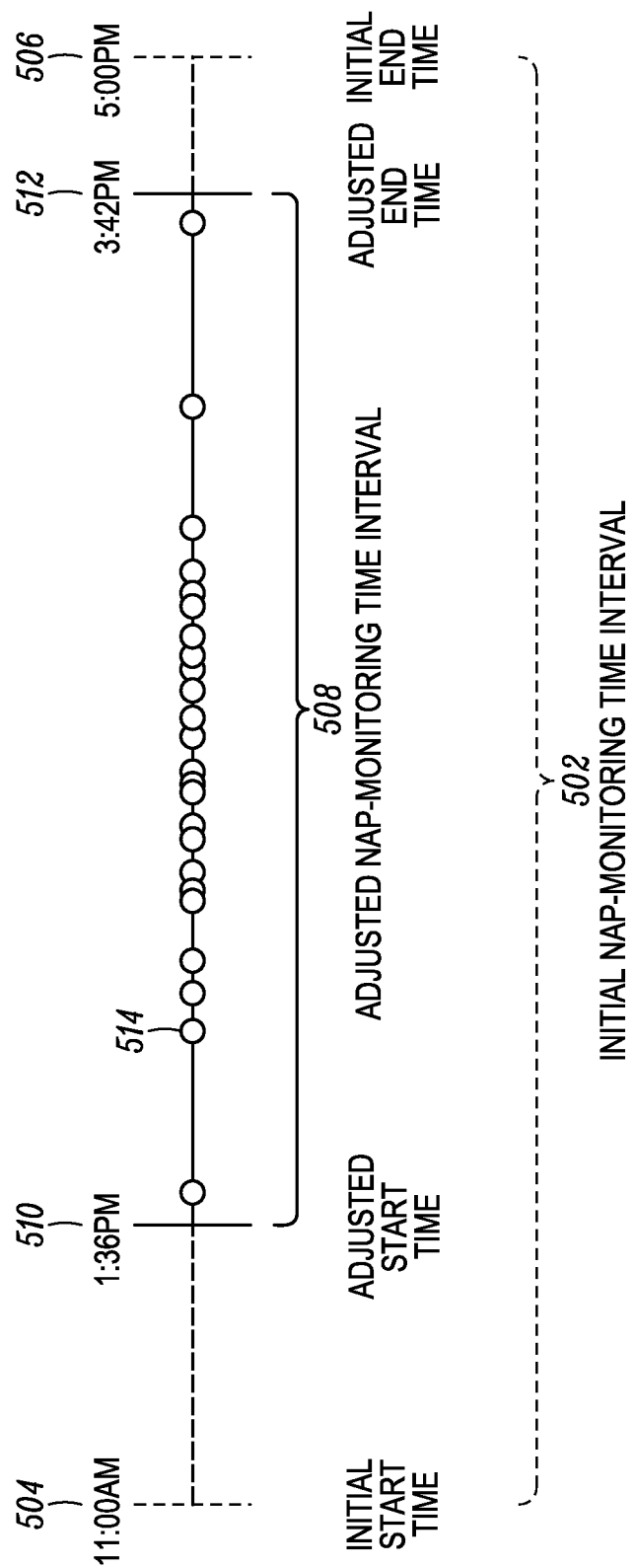
FIG. 5 shows a schematic diagram illustrating the automatic adjusting of a nap-monitoring time interval, in accordance with some embodiments.

Turning momentarily to FIG. 5, an initial nap-monitoring time interval 502 is shown having an initial start time 504 of 11:00 AM and an initial end time 506 of 5:00 PM. The initial nap-monitoring time interval 502, for example, is a default nap-monitoring time interval, a factory preset nap-monitoring time interval, or a nap-monitoring time interval that was set by the first user. In repeatedly performing the method 300 over the course of four months, the first device 100 detects the first user napping during the initial nap-monitoring time interval 502 twenty-four times. The corresponding twenty-four nap detection times recorded by the first device 100 are chronologically plotted in FIG. 5 as open circles 514.

As shown, none of the circles are located in the vicinity of the initial start time 504 or the initial end time 506. Instead, the nap detection times are concentrated near the center of the initial nap-monitoring time interval 502. In performing statistical analysis on the twenty-four nap detection times, the first device 100 determines that based on past napping behavior, the first user is not likely to be napping before 1:36 PM or after 3:42 PM. For an embodiment, this determination is based on the first device 100 calculating statistical confidence intervals and comparing them against a likelihood cutoff value. The first device 100 then resets the initial start time 504 to an adjusted start time 510 of 1:36 PM. The first device 100 also resets the initial end time 506 to an adjusted end time 512 of 3:42 PM. The adjusted start time 510 and the adjusted end time 512 define an adjusted nap-monitoring time interval 508 used by the first device 100 in next monitoring 302 sleeping for the first user.

For further embodiments, the first device 100 repeats the described nap-monitoring time interval adjustment process at a later time to determine a new adjusted nap-monitoring time interval which supersedes the adjusted nap-monitoring time interval 508. In a first case, the first device 100 next repeats the nap-monitoring time interval adjustment process after a predetermined period of time has passed, for instance, four months. In a second case, the first device 100 next repeats the nap-monitoring time interval adjustment process after the first device 100 detects and records a predetermined number of new nap detection times, for instance, twenty-four new nap detection times. In a third case, the first device 100 performs rolling adjustments of the nap-monitoring time interval. The first device 100, for example, records two new nap detection times. The first device 100 also discards an equivalent number of nap detection times from the previous set of twenty-four nap detection times and combines the remaining twenty-two nap detection times with the two new nap detection times. The first device 100 then uses the resulting combination of twenty-four nap detection times to perform statistical analysis and adjust the current nap-monitoring time interval.

Turning back to FIG. 3, the first device 100 temporarily disabling functionality while in nap mode includes the first device 100 disabling or suppressing an audible alert. An audible alert is a sound generated by the first device 100 for the purpose of notifying the first user of an incoming call, message, or notification. Suppressing an audible alert, as previously indicated, has the benefit of not waking the first user while he is napping. In a first example, the first device 100 suppresses a ring tone when the first device 100 receives a call from a second device. In a second example, the first device 100 receives a text message but does not play a sound otherwise played to indicate the receipt of a text message. In a third example, the first device 100 generates a notification indicating that a software upgrade is available but disables an accompanying audible notification tone.

In a first alternative embodiment of the method 300, the method 300 begins with the first device 100 monitoring 308 for the first user to be napping. The first device 100 monitoring 308 for the first user to be napping is no longer preconditioned on the first device 100 monitoring sleeping 302 for the first user, determining a sleep quality score 304, and comparing the sleep quality score against a threshold sleep quality score. In a second alternative embodiment of the method 300, the first device 100 does not automatically adjust 312 at least one of a start time or an end time for the nap-monitoring time interval based on the nap detection time. A third alternative embodiment of the method 300 combines the omissions 302, 304, 306, and 312 indicated for the first and second alternative embodiments.

The description of the method 300 continues with reference to FIG. 4. While the first device 100 is in the nap mode, the first device 100 receives 416 a call from a second device, taken to be a smartphone 602 shown in FIG. 6. A second user, for example, uses her smartphone 602 to make a telephone call to the smartphone 100. Because the first device 100 is in the nap mode, the first device 100 silences 418 a ring tone from playing on the first device 100.

For an embodiment, the first device 100 sends 420 a first indication to the second device 602. An indication the first device 100 sends to another electronic device is a communication that transfers data to the other device. The indication, when received by the other device, causes the other device to perform an action in accordance with functionality included in the other device. In response to receiving the first indication, the second device 602 changes a ring-back tone it plays when placing a call to the first device 100. The changed ring-back tone provides the second user with notice that the first user is unavailable, or more specifically, that the first device 100 is in the nap mode. In a further embodiment, the second device 602 also displays, in response to receiving the first indication, a notification on a display of the second device 602, wherein the notification visually informs the second user that the first user is unavailable.

In additional embodiments, the first device 100 sends 422 a second indication to the second device 602 indicating the first user is unavailable. For a first embodiment, the first device 100 sends 422 the second indication to the second device 602 when the second device 602 calls the first device 100 while the first device 100 is in the nap mode. The second indication causes the second device 602 to present a third indication when a call is initiated from the second device 602 to a third electronic device belonging to a contact stored on the second device 602 for the first user. The third indication is configured to provide a notification on the second device 602 indicating that the first user is unavailable.

In a first embodiment, for example, the second user, Sue, decides to call the first user, Mike. Sue brings up Mike's contact information on her smartphone 602. For the contact Mike, Sue has three phone numbers stored on her smartphone 602: Mike's smartphone number, Mike's landline number, and Mike's office number. Sue selects Mike's smartphone number to ring Mike's smartphone 100 but receives no answer. Sue then tries to reach Mike by calling his landline number. In response to Sue selecting Mike's landline number, Sue's smartphone 602 displays a notification indicating that Mike is unavailable. Sue's smartphone 602 does not make the call to Mike's landline phone, thereby allowing Mike to continue napping.

When Sue's smartphone 602 called Mike's smartphone 100, her smartphone 602 received the second indication from Mike's smartphone 100. The second indication activated functionality on Sue's smartphone 602. For instance, with the functionality activated, Sue's smartphone 602 monitored all the phone numbers stored on Sue's smartphone 602 for the contact Mike. Specifically, Sue's smartphone 602 monitored for any attempted calls placed to any of Mike's phone numbers as determined from Mike's contact information stored on Sue's smartphone 602. When Sue tried to call Mike's landline phone number, Sue received the notification that Mike was unavailable. Because Sue's call was not completed, Mike was not disturbed while napping.

For a second embodiment, the first device 100 automatically sends the second indication to the second device 602 while the first device 100 is in the nap mode. The second indication causes the second device 602 to present a third indication when a call is initiated from the second device 602 to a third electronic device belonging to a contact stored on the second device 602 for the first user. The third indication is configured to provide a notification on the second device 602 indicating that the first user is unavailable. The first device 100 sends an indication to another device automatically when the indication is not sent in direct response to the other device calling or messaging the first device 100. This embodiment is described in greater detail with reference to FIG. 6.

Figure 6:
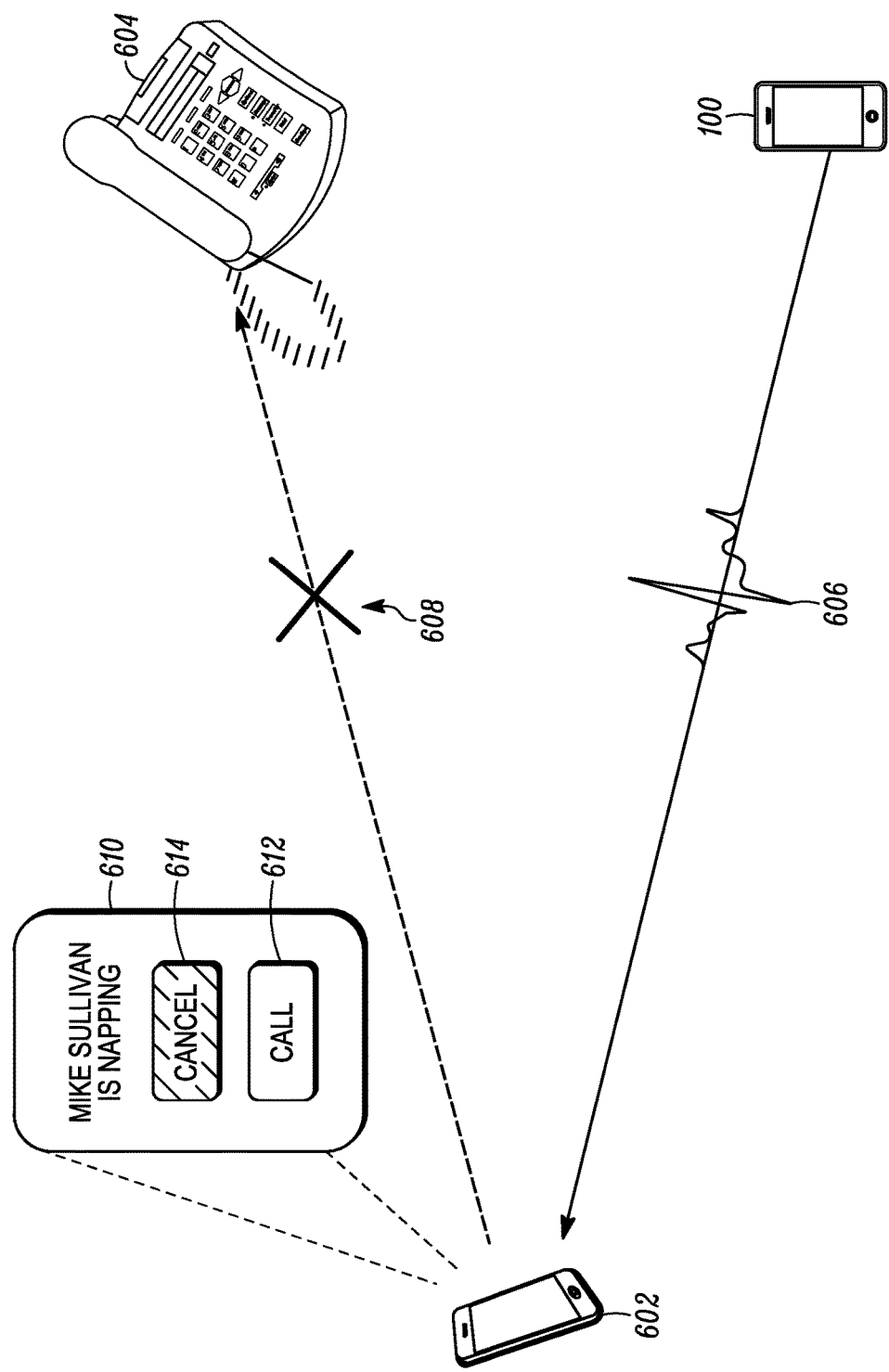
FIG. 6 shows a schematic diagram illustrating a first electronic device in a nap mode sending an indication to a second electronic device, in accordance with some embodiments.

FIG. 6 shows the first device 100, the second indication, which is indicated at 606, the second device 602, and the third device, which is indicated at 604. The first device 100 detects 310 that the first user, Mike Sullivan, is napping and transitions 314 into the nap mode. In the nap mode, the first device 100 sends the second indication 606 to the second device 602. The first device 100 sends the second indication automatically, without the second device 602 initially calling the first device 100.

In one case, the second user of the second device 602 belongs to a selected contact group on the first device 100. The first device 100 sends the second indication 606 to a group of other electronic devices associated with a group of contacts on the first device 100. The group of contacts, for instance, might be a trusted group of contacts the first user has previously specified. These trusted contacts could represent close friends or family members of the first user, or people to which the first user does not mind disclosing napping information to. The first user's close friends and family members are the most likely people to call the first user while the first user is napping because friends and family members tend to call more often than lesser acquaintances. The group of electronic devices could also be automatically selected by the first device 100. For example, the first device 100 sends the second indication 606 to the five devices which call the first device 100 with the greatest frequency.

The second device 602 receiving the second indication 606 activates contact monitoring functionality included in the second device 602. The second device 602 identifies phone numbers stored on the second device 602 for the contact Mike Sullivan. In this instance, the second device 602 identifies a landline number for the third device 604, Mike's landline phone. The second device 602 monitors for the second user, Sue, to attempt a call to Mike's landline phone 604. When Sue attempts to call to Mike's landline phone 604, the second device 602 blocks the call, as indicated at 608, and visually presents a notification 610 on a display of the second device 602. The notification 610, as shown, indicates Mike Sullivan is napping. In another embodiment, the notification 610 simply indicates Mike Sullivan is unavailable. If it is important that Sue speak to Mike, Sue can tap a virtual button 612 within the notification 610 to complete the call. If, however, Sue does not wish to disturb Mike, she can tap a virtual button 614 to cancel the call.

For a third embodiment, the first device 100 automatically sends the second indication 606 to the second device 602 while the first device 100 is in the nap mode. The second indication 606 causes the second device 602 to present a third indication when a call is initiated from the second device 602 to the first device 100. The third indication is configured to provide a notification on the second device 602 indicating that the first user of the first device 100 is unavailable. When Mike's smartphone 100 detects 310 that Mike is napping, for example, Mike's smartphone 100 automatically sends the second indication to Sue's smartphone 602 before Sue uses her smartphone 602 to call Mike's smartphone 100. The second indication causes Sue's smartphone 602 to monitor the phone number of Mike's smartphone 100. When Sue uses her smartphone 602 to initiate a call to Mike's smartphone 100, Sue's smartphone 602 presents the notification 610 indicating that Mike is either unavailable or napping.

Returning to FIG. 4 and the method 300, the first device 100 monitors for the first user to wake from napping. When the first device 100 detects 424, using one or more of its sensors, that the first user is awake, the first device 100 terminates the nap mode. In terminating the nap mode, the first device 100 enables at least one audible alert that was disabled on the first device 100 during the nap mode. The ring tone silenced 418 on the first device 100, for instance, is allowed to play when the first device 100 terminates the nap mode. The first device 100 also sends 426 a fourth indication to the second device 602 indicating the first user is available.

In one embodiment, the first device 100 receives a call from the second device 602 while the first device 100 is in the nap mode. The first device 100 silences 418 a ring tone on the first device 100 in response to receiving the call and also sends 422 a second indication to the second device 602 configured to provide an alert on the second device 602 indicating that the first user of the first device 100 is unavailable. When the first device 100 detects 424 that the first user is awake, the first device 100 automatically sends 426 a fourth indication to the second device 602 configured to provide a notification on the second device 602 indicating that the first user is available to receive calls. For example, if the second user tries to call the first user while the first user is napping, then the second user gets a later notification when the first user wakes. The later notification is automatic in that the second user does not need to place another call to the first device in order to be notified that the first user is awake.

In a further embodiment, the second user receives the later notification when the first user is both awake and in proximity to the first device 100. The first device 100 detects that the first user is in proximity to the first device 100, and the first device 100 sends 426 the fourth indication in response to detecting the first user is awake and in proximity to the first device 100. For instance, the first device 100 detects that the first user is in proximity to the first device 100 when the first user is within approximately eight feet of the first device 100, which is sufficiently near the device 100 for the first user to hear a ring tone played by the first device 100. To detect the first user is within eight feet of the first device 100, the first device 100 uses its thermal sensors 118, 120, 122, 124. At closer distances of approximately two feet, the first device 100 also uses its infrared sensor 126 to detect the presence of the first user.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential feature or element of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processing elements (also referred to as processors or processing devices) such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method performed by a first electronic device for managing a nap mode, the method comprising:
monitoring sleeping for a first user of the first electronic device during a sleep-monitoring time interval, wherein the sleep-monitoring time interval is a primary and periodic time period during which the first user regularly sleeps;
determining a sleep quality score for the first user based on the monitoring, wherein the sleep quality score is a quantitative assessment of how the first user sleeps during the sleep-monitoring time interval;
responsive to the sleep quality score being less than a threshold sleep quality score, monitoring for the first user to be napping during a nap-monitoring time interval that is nonconcurrent with the sleep-monitoring time interval;
detecting during the nap-monitoring time interval that the first user is napping;
initiating the nap mode on the first electronic device in response to detecting the first user is napping, wherein the nap mode comprises disabling an audible alert on the first electronic device;
receiving a communication from a second user of a second electronic device; and
responsive to receiving said communication, sending an indication that is configured to change an operating condition on the second device based on sensing that the first user of the first electronic device is napping.

2. The method of claim 1, wherein the disabling comprises at least one of:
disabling an audible ring tone on the first electronic device when the first electronic device receives a call from a second electronic device; or
disabling an audible notification tone on the first electronic device when the first electronic device generates a notification.

3. The method of claim 1 further comprising the first electronic device receiving as input a start time and an end time for the nap-monitoring time interval.

4. The method of claim 1 further comprising the first electronic device automatically adjusting at least one of a start time or an end time for the nap monitoring time interval based on a nap detection time.

5. The method of claim 1, wherein said receiving a communication comprises receiving a call from the second device and wherein said operating condition comprises a ring-back tone played on the second electronic device.

6. The method of claim 1, wherein said receiving a communication comprises receiving a call from the second device and said operating condition, wherein:
the indication causes the second electronic device to change the operating condition by presenting a second indication when a call is initiated from the second electronic device to a third electronic device belonging to a contact stored on the second electronic device for the first user; and
the second indication is configured to provide a notification on the second electronic device indicating that the first user is unavailable.

7. The method of claim 1 wherein:
the indication causes the second electronic device to present a second indication when a call is initiated from the second electronic device to the first electronic device; and
the second indication is configured to provide a notification on the second electronic device indicating that the first user of the first electronic device is unavailable.

8. The method of claim 1 wherein:
the indication causes the second electronic device to present a second indication when a call is initiated from the second electronic device to a third electronic device belonging to a contact stored on the second electronic device for the first user; and
the second indication is configured to provide a notification on the second electronic device indicating that the first user is unavailable.

9. The method of claim 8, wherein a second user of the second electronic device belongs to a selected contact group on the first electronic device.

10. The method of claim 1 further comprising:
monitoring for the first user to wake from napping;
detecting the first user is awake; and
terminating the nap mode in response to detecting the first user is awake, wherein terminating the nap mode comprises enabling at least one audible alert disabled on the first electronic device during the nap mode.

11. The method of claim 1, wherein:
said receiving a communication comprises receiving a call from the second electronic device while the first electronic device is in the nap mode; and further comprising:
silencing a ring tone on the first electronic device in response to receiving the call;
wherein said sending an indication to the second electronic device in response to receiving the call changes an operating condition effective to provide a first notification on the second electronic device indicating that the first user of the first electronic device is unavailable; and further comprising:
detecting the first user is awake; and
automatically sending a second indication to the second electronic device in response to detecting the first user is awake, wherein the second indication is configured to provide a second notification on the second electronic device indicating that the first user of the first electronic device is available to receive calls.

12. The method of claim 11 further comprising detecting that the first user of the first electronic device is in proximity to the first electronic device, wherein the second indication is sent in response to detecting the first user is awake and in proximity to the first electronic device.

13. A method performed by a first electronic device for managing a nap mode, the method comprising:
monitoring sleeping for a first user of the first electronic device during a sleep-monitoring time interval, wherein the sleep-monitoring time interval is a primary and periodic time period during which the first user regularly sleeps;
determining a sleep quality score for the first user based on the monitoring, wherein the sleep quality score is a quantitative assessment of how the first user sleeps during the sleep-monitoring time interval;

responsive to the sleep quality score being less than a threshold sleep quality score, monitoring for the first user of the first electronic device to be napping, wherein the monitoring is limited to a nap-monitoring time interval occurring during daytime;

detecting, while monitoring, that the first user is napping at a nap detection time;

automatically adjusting at least one of a start time or an end time for the nap-monitoring time interval based on the nap detection time;

initiating the nap mode on the first electronic device in response to detecting the first user is napping, wherein the nap mode comprises disabling an alert on the first electronic device;

receiving a communication from a second user of a second electronic device; and responsive to receiving said communication, sending an indication that is configured to change an operating condition on the second device based on sensing that the first user of the first electronic device is napping.

14. The method of claim 13 wherein the receiving a communication comprises receiving a call from the second device and the sending an indication comprises sending the indication to the second electronic device calling the first electronic device while the first electronic device is in the nap mode, wherein the indication changes an operating condition comprising a ring-back tone played on the second electronic device.

15. The method of claim 13 wherein the receiving a communication comprises receiving a call from the second device, wherein:

the indication causes the second electronic device to present a second indication when a call is initiated from the second electronic device to a third electronic device belonging to a contact stored on the second electronic device for the first user; and the second indication is configured to provide a notification on the second electronic device indicating that the first user is unavailable.

16. The method of claim 13 wherein:

the indication causes the change to the operating condition effective to cause the second electronic device to present a second indication when a call is initiated from the second electronic device to the first electronic device or a third electronic device belonging to a contact stored on the second electronic device for the first user; and the second indication is configured to provide a notification on the second electronic device indicating that the first user is unavailable.

17. The method of claim 13, wherein:

receiving the communication comprises receiving a call from the second electronic device; and wherein:

the alert comprises a ring tone on the first electronic device;

said sending the indication is effective to indicate that the first user of the first electronic device is unavailable; and further comprising:

detecting the first user is awake; and automatically sending a second indication to the second electronic device in response to detecting the first user is awake, wherein the second indication is configured to provide a notification on the second electronic device indicating that the first user of the first electronic device is available to receive calls.

18. The method of claim 17 further comprising detecting that the first user of the first electronic device is in proximity to the first electronic device, wherein the second indication is sent in response to detecting the first user is awake and in proximity to the first electronic device.

19. A first electronic device configured to manage a nap mode, the first electronic device comprising:

a clock configured to indicate time;

a set of sensors configured to detect if a first user of the first electronic device is napping; and a processing element operatively coupled to the clock and the set of sensors, wherein the processing element is configured to:

monitor, using the set of sensors, sleeping of the first user during a sleep-monitoring time interval indicated by the clock, wherein the sleep-monitoring time interval is a primary and periodic time period during which the first user regularly sleeps;

determine a sleep quality score for the first user based on the monitoring, wherein the sleep quality score is a quantitative assessment of how the first user sleeps during the sleep-monitoring time interval;

responsive to the sleep quality score being less than a threshold sleep quality score, monitor for the first user to be napping during a nap-monitoring time interval, indicated by the clock, which is nonconcurrent with the sleep monitoring time interval;

detect during the nap-monitoring time interval, using the set of sensors, that the first user is napping;

initiate the nap mode on the first electronic device in response to detecting the first user is napping, wherein the nap mode comprises disabling an audible alert on the first electronic device;

receiving a communication from a second user of a second electronic device; and responsive to receiving said communication, sending an indication that is configured to change an operating condition on the second device based on sensing that the first user of the first electronic device is napping.

20. The first electronic device of claim 19 further comprising at least one communication interface configured to receive calls from and send indications to a second electronic device, wherein the processing element is operatively coupled to the at least one communication interface and further configured to automatically send the indication to the second electronic device using the at least one communication interface while the first electronic device is in the nap mode, wherein:

the indication causes the second electronic device to present a second indication when a call is initiated from the second electronic device to the first electronic device or a third electronic device belonging to a contact stored on the second electronic device for the first user of the first electronic device; and the second indication is configured to provide a notification on the second electronic device indicating that the first user of the first electronic device is unavailable.

* * * * *